(12) United States Patent
Protin et al.

(10) Patent No.: US 8,670,919 B2
(45) Date of Patent: Mar. 11, 2014

(54) METHOD FOR DIAGNOSING THE CONDITION OF AN ENGINE FUEL SUPPLY SYSTEM

(75) Inventors: Nicolas Protin, Versailles (FR); Michel Leporcq, Morsang sur Orge (FR)

(73) Assignee: Renault S.A.S., Boulogne Billancourt (FR)

(*) Notice: Subject to any disclaimer, the term of this patent is extended or adjusted under 35 U.S.C. 154(b) by 810 days.

(21) Appl. No.: 12/743,277

(22) PCT Filed: Nov. 5, 2008

(86) PCT No.: PCT/FR2008/051992
§ 371 (c)(1),
(2), (4) Date: Oct. 22, 2010

(87) PCT Pub. No.: WO2009/068779
PCT Pub. Date: Jun. 4, 2009

(65) Prior Publication Data
US 2011/0030665 A1    Feb. 10, 2011

(30) Foreign Application Priority Data
Nov. 20, 2007 (FR) ..................... 07 08130

(51) Int. Cl.
*B60T 7/12* (2006.01)
*G06F 7/00* (2006.01)
*G06F 17/00* (2006.01)
*G06F 19/00* (2011.01)

(52) U.S. Cl.
USPC ........... 701/109; 701/103; 701/104; 701/105; 123/672

(58) Field of Classification Search
USPC .......... 123/672, 674, 688, 690; 701/101, 102, 701/103, 104, 105, 109
See application file for complete search history.

(56) References Cited

U.S. PATENT DOCUMENTS

| | | | | |
|---|---|---|---|---|
| 4,287,865 A | * | 9/1981 | Seitz | 123/687 |
| 5,579,747 A | * | 12/1996 | Sato et al. | 123/690 |
| 5,623,913 A | * | 4/1997 | Kitajima et al. | 123/673 |
| 5,706,793 A | * | 1/1998 | Orzel et al. | 123/690 |

(Continued)

FOREIGN PATENT DOCUMENTS

EP    0 810 364    12/1997

OTHER PUBLICATIONS

U.S. Appl. No. 13/319,243, filed Nov. 7, 2011, Protin, et al.
U.S. Appl. No. 12/743,111, filed May 14, 2010, Protin, et al.

*Primary Examiner* — Stephen K Cronin
*Assistant Examiner* — Raza Najmuddin
(74) *Attorney, Agent, or Firm* — Oblon, Spivak, McClelland, Maier & Neustadt, L.L.P.

(57) ABSTRACT

A method for diagnosing a condition of a system for supplying fuel to a fuel injected controlled-ignition internal combustion engine, of a type including an electric control device that makes use of an oxygen probe for closed-loop regulation of a value of an air/fuel ratio admitted to the combustion chambers of the engine, and according to which a signal delivered by the oxygen probe is analyzed, the method a) deducing from the signal a change in injection time correction factor ALPHACL_MEAN making it possible to regulate richness of exhaust gases leaving the engine; b) comparing ALPHACL_MEAN against predetermined minimum and maximum threshold values THRESHOLD_MIN and THRESHOLD_MAX; c) diagnosing a defective condition when ALPHACL_MEAN is outside of a window included between THRESHOLD_MIN and THRESHOLD_MAX.

7 Claims, 4 Drawing Sheets

(56) References Cited

U.S. PATENT DOCUMENTS

| | | |
|---|---|---|
| 5,806,498 A | 9/1998 | Iwai et al. |
| 6,067,965 A * | 5/2000 | Trumpy et al. ............... 123/480 |
| 6,453,720 B1 * | 9/2002 | Tomisawa ..................... 73/1.06 |
| 6,568,246 B1 * | 5/2003 | Ponagai et al. ............ 73/40.5 R |
| 6,684,869 B2 * | 2/2004 | Ponagai et al. ............... 123/680 |
| 6,708,681 B2 * | 3/2004 | Hosoya et al. ................ 123/681 |
| 7,040,307 B2 * | 5/2006 | Nagashima et al. .......... 123/688 |
| 7,047,123 B2 * | 5/2006 | Katoh ........................... 701/104 |
| 7,216,639 B2 * | 5/2007 | Ozaki et al. ................... 123/674 |
| 7,475,683 B2 * | 1/2009 | Kokubu ......................... 123/672 |
| 7,562,561 B2 * | 7/2009 | Murakami ..................... 73/49.7 |
| 7,865,295 B2 * | 1/2011 | Tashima ........................ 701/109 |
| 7,987,039 B2 * | 7/2011 | Takagawa ..................... 701/103 |
| 2002/0104508 A1 | 8/2002 | Atago et al. |
| 2003/0131587 A1 * | 7/2003 | Kawamura ...................... 60/276 |
| 2003/0131833 A1 * | 7/2003 | Ponagai et al. ............... 123/680 |
| 2007/0119411 A1 | 5/2007 | Kerns |
| 2007/0295307 A1 | 12/2007 | Kerns |

* cited by examiner

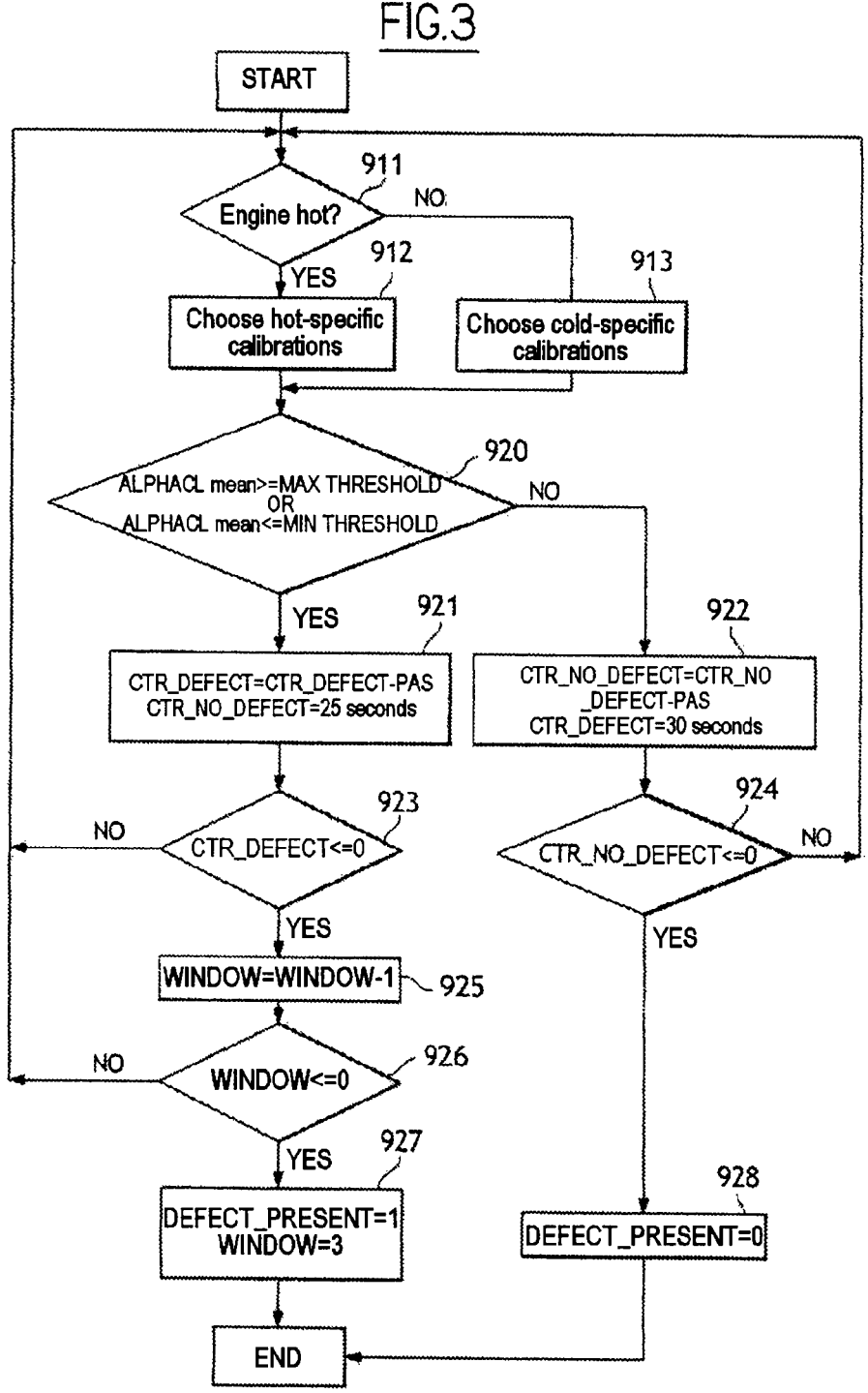

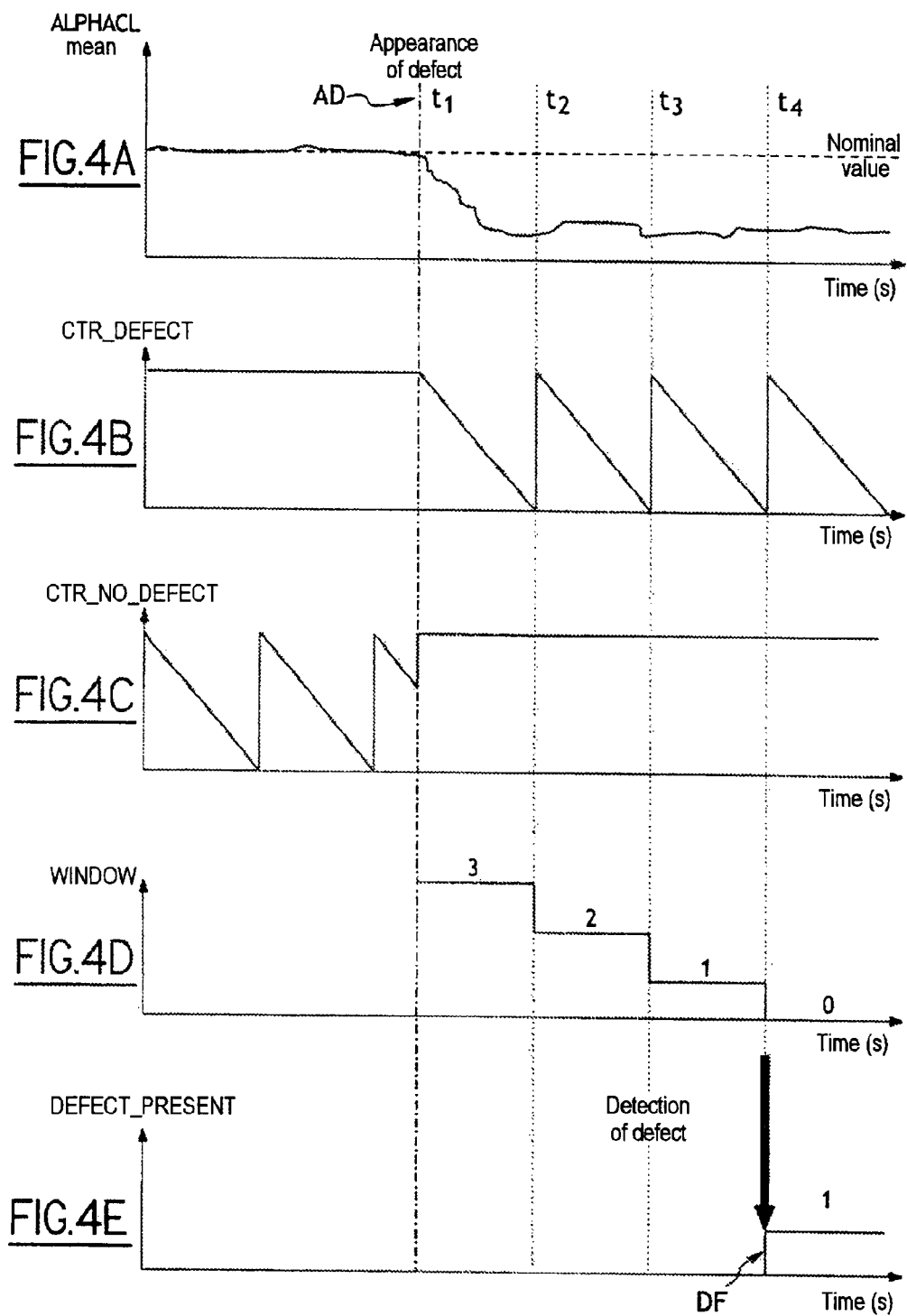

METHOD FOR DIAGNOSING THE CONDITION OF AN ENGINE FUEL SUPPLY SYSTEM

The present invention relates to a method for diagnosing the state of a system for supplying fuel to a fuel-injected, controlled-ignition internal combustion engine, of the type comprising an electronic control device which makes use of an oxygen probe for closed-loop regulation of the value of the air-fuel ratio admitted into the combustion chambers of said engine.

Current regulations, in terms of pollutant emissions, demand "the monitoring of the fuel supply system in relation to its capacity to meet the emissions standards". A failure of this system leading to a violation of the "OBD thresholds" (OBD standing for On Board Diagnostic) must be signaled to the driver of the vehicle by the lighting of an "OBD" lamp.

Defects in a fuel supply system, such as fuel leaks, obstructions or ageing, lead to a variation of the hydraulic characteristics within said system, which consequently impairs the quality of the regulation of the fuel richness of the injected fuel/air mixture.

Thus, the richness leaving the engine is no longer contained within the effectiveness window of the catalytic converter at certain operating points of the engine, then leading to a drop in the effectiveness of said engine, and an increase in the quantity of pollutants emitted from the vehicle's exhaust gas manifold.

Observing the requirement detailed above amounts to finding means for directly or indirectly monitoring the quantity of fuel injected.

The document FR-A-2 726 860, in the name of the present applicant, describes a method that can be used to monitor the fuel feed circuit via the output voltage of an oxygen probe (lambda binary probe).

As soon as this voltage remains at a predetermined low value for a certain time, then a defective state is confirmed.

This technique can be used to detect faults due to a general reduction in the richness of the exhaust gases upstream of the catalytic converter, but not those resulting from an increase in this richness.

Furthermore, to detect a defect, it is necessary for the signal delivered by the probe to remain "aligned" on said low value for a certain time, so that only the very severe defects causing the "OBD thresholds" to be greatly exceeded are detected.

In these conditions, such a method is not suitable for detecting the defects of the fuel feed circuit, if the current standards are taken into account.

The present invention aims to resolve these problems, by proposing a method for diagnosing the state of a system for supplying fuel to a fuel-injected, controlled-ignition internal combustion engine, which makes it possible to detect defects due equally to an increase or to a drop in the richness of the exhaust gases, and do so rapidly, and without having to make use of additional specific means.

Thus, the invention relates to a method for diagnosing the state of a system for supplying fuel to a fuel-injected, controlled-ignition internal combustion engine, of the type comprising an electronic control device which makes use of an oxygen probe for closed-loop regulation of the value of the air-fuel ratio admitted into the combustion chambers of said engine, and according to which the signal delivered by said oxygen probe is analyzed, characterized in that it consists in:
(a) deducing from said signal, the change in the injection time correction factor ALPHACL_MEAN that makes it possible to regulate the richness of the exhaust gases leaving the engine, ALPHACL_MEAN being given by the relation:

$$\text{effective injection time} = B + \text{ALPHACL\_MEAN} * \text{GAIN} * A * \text{Mair},$$

in which:
B is an OFFSET value which corrects the actual injection time according to the aging of the fuel supply system;
GAIN is a coefficient making it possible to take account of the drift in the hydraulic characteristics of the fuel supply system due to aging;
A is a factor that takes into account various phenomena notably linked to canister draining, the wetting of the walls;
Mair is the measured or estimated mass of air admitted into a cylinder of the engine;
(b) comparing ALPHACL_MEAN with predetermined minimum and maximum threshold values THRESHOLD_MIN and THRESHOLD_MAX;
(c) diagnosing a defective state when ALPHACL_MEAN is outside the window contained between THRESHOLD_MIN and THRESHOLD_MAX.

According to other advantageous and non-limiting characteristics of this method:
in the step c), the number of time periods during which ALPHACL_MEAN is outside the window contained between THRESHOLD_MIN and THRESHOLD_MAX is counted and said defective state is diagnosed when the number of periods is equal to a predetermined number;
the WINDOW variable is assigned to said predetermined number, the value 1 is subtracted from this variable as soon as a new time period is counted, and that said defective state is diagnosed when the WINDOW variable is less than or equal to zero;
said steps a), b) and c) are implemented only if at least one of the following preconditions is satisfied:
said richness is being regulated in closed loop mode;
fuel injection is operating in sequential mode;
the load level of the engine (1) and its speed are situated within a predefined region;
the sensors for measuring the variables necessary to the diagnosis are not defective;
said steps a), b) and c) are implemented only if all said preconditions are satisfied;
said threshold values depend on the operating conditions of the engine;
said threshold values vary depending on whether the engine is operating hot or cold.

Other features and benefits of the present invention will become apparent from reading the following description of a preferential embodiment. This description will be given with reference to the appended drawings in which:

FIGS. 2 and 3 are block diagrams detailing the various steps of the inventive method;

FIGS. 4A to 4E are curves giving, as a function of time, the trend of the main parameters ALPHACL_MEAN, CTR_DEFECT, CTR_NODEFECT, WINDOW and DEFECT_PRESENT used in the context of the present method, as illustrated in FIGS. 2 and 3.

Figure 1:
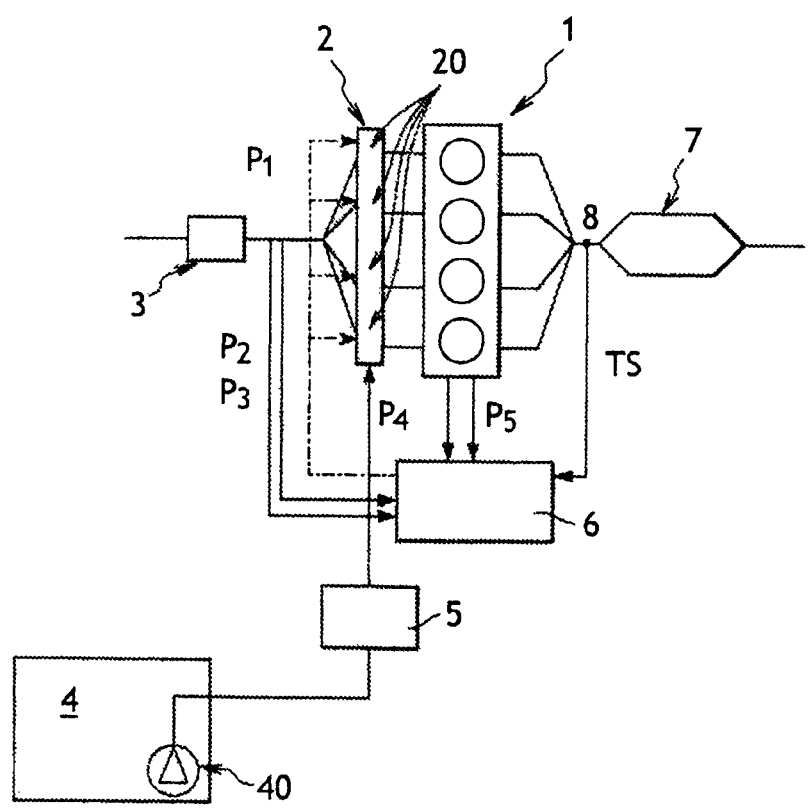
FIG. 1 is a diagrammatic view of an internal combustion engine equipped with a device for implementing the inventive method.

The appended FIG. 1 diagrammatically represents a controlled-ignition, multicylinder internal combustion engine 1, which is equipped with an electrically controlled, multipointinjection fuel supply rail 2. Thus, each cylinder of the engine is supplied by an electro-injector 20 dedicated to it. An electronic control system 6 controls the open time of each injector so as to adjust the air/fuel mixture admitted into the engine to a given richness value (preferably close to the stoichiometric ratio).

The fuel, stored in a tank 4, is brought to the injectors 20, via a pump 40 and a filter 5.

In parallel, a butterfly valve 3 delivers fresh air.

Downstream of the engine 1, on the exhaust line, there is provided a catalytic converter 8. Just upstream of the latter there is an oxygen probe 8.

The system 6 notably comprises, in a manner known per se, a central unit, memories and various input and output interfaces. This system receives input signals notably relating to the operation of the engine, performs operations and generates output signals, notably intended for the injectors.

The input signals that the system 6 may have to process include the following: the "load" of the engine, the "speed" of the engine, the output signal from the oxygen probe, the "non-failure" of the sensors responsible for managing the diagnosis, and so on.

For this, the engine and/or its immediate environment are provided with:
means P1 of controlling the injectors;
means of measuring or estimating the air temperature in the air distributor at the intake P2;
means of measuring or estimating the pressure in the air distributor at the intake P3;
means of measuring or estimating the water temperature P4;
means of measuring or estimating the speed P5;
means of measuring the output voltage PS of the probe 8.

Figure 2:
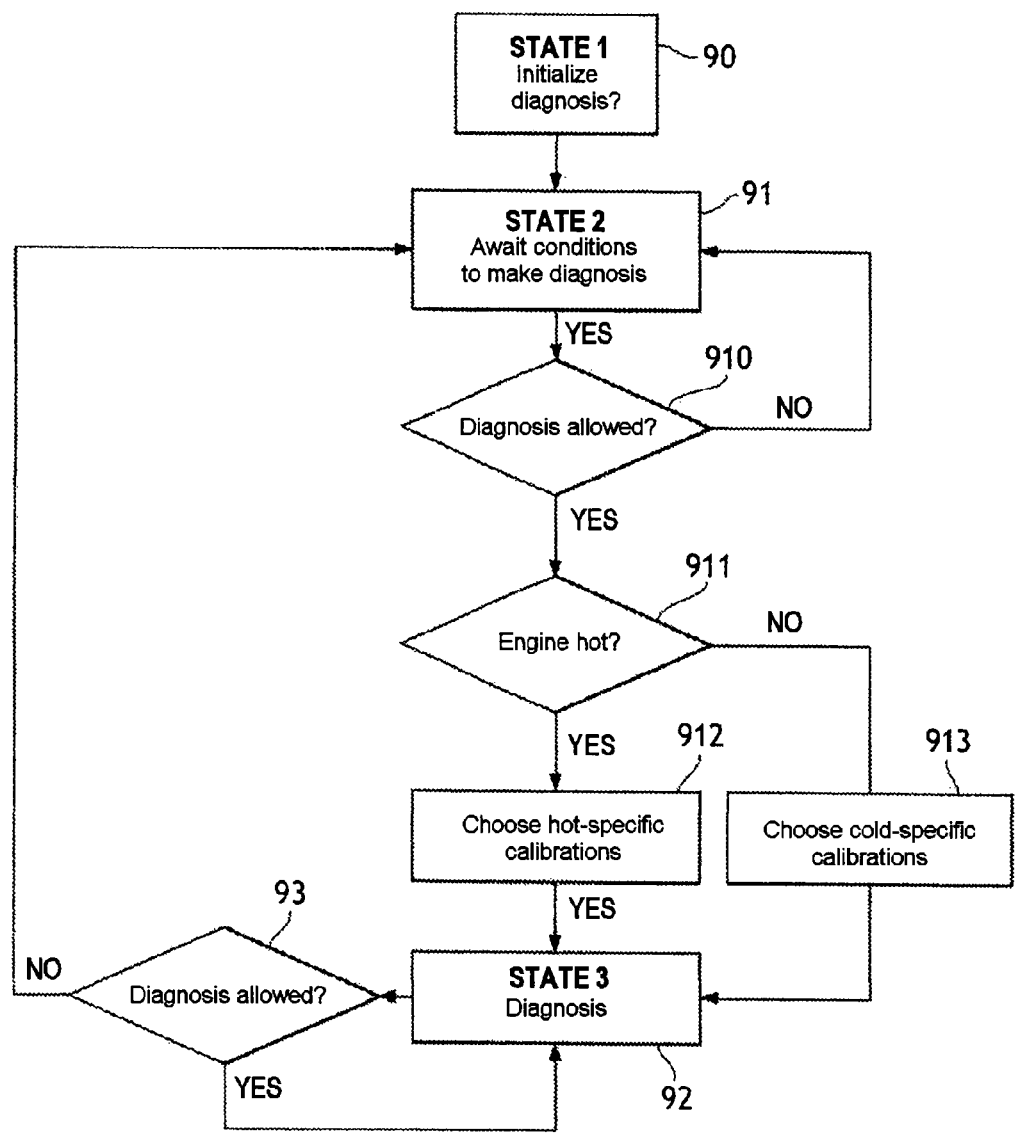

With reference to FIG. 2 and then FIG. 3, there now follows a description of one possible implementation of the inventive method.

This implementation involves three "states". The "STATE 1" (block 90) corresponds to the initialization of all the variables used for the diagnosis. The "STATE 2" (block 91) is a waiting state pending suitable conditions for performing the diagnosis. This corresponds to the first two blocks of FIG. 2.

Finally, the "STATE 3" (block 92) corresponds to the actual diagnosis of the fuel supply circuit.

However, to move from "STATE 2" to "STATE 3", a check is carried out to ensure that the diagnosis activation conditions are met (block 910).

In other words, a check is carried out to ensure that:
richness regulation is in closed loop mode;
injection is operating in sequential mode;
the load level of the engine and its speed are situated within a predefined region;
the sensors used to determine the inputs consumed by the diagnosis are not defective.

The "STATE 3" is retained as long as the diagnosis activation conditions are present.

Before moving to the "STATE 3", a check is carried out to see whether the engine is hot. If it is (block 912), hot-specific calibrations are configured, whereas, if it is cold (block 913), other cold-specific calibrations are configured. These calibrations are notably the detection thresholds and times.

When ALPHACL_MEAN is within the window delimited by two thresholds, minimum THRESHOLD_MIN and maximum THRESHOLD_MAX (block 920), then the time counter CTR_NO_DEFAULT determining the time spent without a fault between the two thresholds, is engaged, whereas the time counter CTR_DEFAULT determining the time spent with the fault between the two thresholds is reinitialized (block 922).

As soon as CTR_NO_DEFAULT reaches a zero value (block 924), a DEFECT_PRESENT information item becomes equal to zero (block 928) and notifies that no defect has been detected on the fuel supply system.

When ALPHACL_MEAN departs from the region delimited by the abovementioned two thresholds (block 920), then the time counter CTR_DEFAULT determining the time spent outside two thresholds is triggered, whereas the time counter CTR_NO_DEFAULT determining the time spent with no fault between the two thresholds is reinitialized (block 921).

As soon as CTR_DEFAULT reaches a zero value (block 923), a WINDOW variable, which was originally assigned a predetermined value, for example the value 3, is decremented by one unit (block 925).

As long as the WINDOW variable is greater than zero, the diagnosis is repeated.

When WINDOW is equal to zero (block 926), then DEFECT_PRESENT becomes equal to one (block 927), and notifies that a defect is detected on the fuel supply system. The WINDOW variable is then reinitialized.

In nominal operation, that is to say when there is no defect on the fuel feed circuit, the richness of the exhaust gases leaving the engine and upstream of the catalytic converter remains permanently very close to the stoichiometric ratio, and consequently, the correction of the injection time is small. ALPHACL_MEAN remains very close to its nominal value and contained between the two threshold values. No fault is therefore detected.

In so-called "defective" operation, that is to say when there is a defect on the feed circuit, of the leak, obstruction, mechanically broken fuel pump, and other such types, the richness of the exhaust gases is far from the stoichiometric ratio when no correction of the injection time is applied.

Once the closed richness regulation loop is activated, the effect of the defect on the injected quantity is compensated via ALPHACL_MEAN which increases or reduces the injection time so that the richness upstream of the catalytic converter coincides with the stoichiometry. Thus, ALPHACL_MEAN departs from the window delimited by the two thresholds. A defect is then detected after a few tens of seconds.

The curves of FIG. 4 show the trend, as a function of time, of some of the parameters given hereinabove.

The vertical line AD corresponds to the time of appearance of the defect, whereas the arrow DF corresponds to the time of detection of this defect.

As long as the value ALPHACL_MEAN is contained within the window delimited by two thresholds, minimum THRESHOLD_MIN and maximum THRESHOLD_MAX, that is to say is close to its nominal value (part of the curve of FIG. 4A situated between t=0 and t1), the variable CTR_DEFECT is reinitialized (corresponding part of FIG. 4B). In parallel, the variable CTR_NODEFECT (corresponding part of FIG. 4C) which is a time counter, is engaged and reinitialized on each check.

At the time t1, the value ALPHACL_MEAN is no longer contained within the window delimited by two thresholds, minimum THRESHOLD_MIN and maximum THRESHOLD_MAX, which corresponds to the appearance of a defect AD.

The variables CTR_DEFECT and CTR_NODEFECT are then respectively decremented and reinitialized, as long as the value ALPHACL_MEAN is outside the window, that is to say after the times t2, t3 and t4 (parts of the curves of FIGS. 4B and 4C situated to the right of the time t1).

Immediately upon the appearance of the defect AD, the WINDOW variable is assigned the value 3 and this value is decremented by one unit at the end of each of the times t2, t3 and t4 (FIG. 4D).

Finally, as soon as WINDOW reaches the zero value (that is to say at the time t4), then the variable DEFECT_PRESENT becomes equal to 1 and the defect DF is detected (FIG. 4E).

The invention claimed is:

1. A method for diagnosing a state of a system for supplying fuel to a fuel-injected, controlled-ignition internal combustion engine, of a type including an electronic control device that makes use of an oxygen probe for closed-loop regulation of a value of an air-fuel ratio admitted into combustion chambers of the engine, and according to which a signal delivered by the oxygen probe is analyzed, the method comprising:

a) deducing from the signal, a change in injection time correction factor ALPHACL_MEAN that makes it possible to regulate richness of exhaust gases leaving the engine, ALPHACL_MEAN being given by the relation:

effective injection time=$B+$ALPHACL_MEAN*GAIN*$A$*Mair, in which:
B is an offset value;
GAIN is a coefficient making it possible to take account of drift in hydraulic characteristics of the fuel supply system;
A is a factor that takes into account various phenomena notably linked to canister draining, wetting of walls;
Mair is the measured or estimated mass of air admitted into a cylinder of the engine;

(b) comparing ALPHACL_MEAN with predetermined minimum and maximum threshold values THRESHOLD_MIN and THRESHOLD_MAX;

(c) diagnosing a defective state when ALPHACL_MEAN is outside a window included between THRESHOLD_MIN and THRESHOLD_MAX.

2. The method as claimed in claim 1, wherein, in the diagnosing c), a number of time periods during which ALPHACL_MEAN is outside the window included between THRESHOLD_MIN and THRESHOLD_MAX is counted and the defective state is diagnosed when the number of periods is equal to a predetermined number.

3. The method as claimed in claim 2, wherein the WINDOW variable is assigned to the predetermined number, value 1 is subtracted from the WINDOW variable as soon as a new time period is counted, and the defective state is diagnosed when the WINDOW variable is less than or equal to zero.

4. The method as claimed in claim 1, wherein the operations a), b) and c) are implemented only if at least one of the following preconditions is satisfied:
the richness is being regulated in a closed loop mode;
fuel injection is operating in a sequential mode;
a load level of the engine and its speed are situated within a predefined region;
sensors for measuring the variables necessary to the diagnosis are not defective.

5. The method as claimed in claim 4, wherein the operations a), b) and c) are implemented only if all the preconditions are satisfied.

6. The method as claimed in claim 1, wherein the threshold values depend on the operating conditions of the engine.

7. The method as claimed in claim 6, wherein the threshold values vary depending on whether the engine is operating hot or cold.

* * * * *